United States Patent Office 3,083,235
Patented Mar. 26, 1963

3,083,235
ACETYLENIC ETHER POLYMERS AND
THEIR PREPARATION
David J. Mann, Livingston, Donald D. Perry, Morristown, and Rita M. Dudak, Hibernia, N.J., assignors to Thiokol Chemical Corporation, Trenton, N.J., a corporation of Delaware
No Drawing. Filed Oct. 30, 1958, Ser. No. 771,710
13 Claims. (Cl. 260—615)

This invention relates to acetylenic acetal polymers, and to novel methods of preparing them.

The present inventors are applicants of record in a pending patent application, Serial No. 670,846, filed July 3, 1957, now U.S. Patent No. 2,941,010, issued June 14, 1960. In that application there are described and claimed methods and products involving the condensation polymerization of acetylenic glycols with dialkyl acetals; a lower alcohol being a by-product of the reaction. The products are liquid or low-melting, solid polymers, of molecular weights up to about 1,000; and they are useful as intermediates in the synthesis of high specific impulse, solid rocket propellants.

The present invention relates to methods of preparing similar polymers by the condensation of acetylenic glycols with aldehydes; water being a by-product of this reaction.

A principal object of this invention is to provide a new and improved method of forming acetylenic acetal polymers.

Another object is to obtain acetylenic acetal polymers in a more extended range of molecular weights than is the case with the polymers described and claimed in the aforementioned pending application.

Still another object is to obtain purified acetylenic acetal polymers that are substantially free from catalytic materials and from any unreacted starting material.

A still further object is to obtain polyacetals of acetylenic glycols which are not as readily obtainable by the process described in the aforementioned pending application due to certain temperature considerations.

In our preferred method of practicing this invention an acetylenic glycol is condensed directly with an aldehyde, such as formaldehyde, in the presence of a strong acid catalyst, preferably p-toluenesulfonic acid. Formaldehyde can be used conveniently in the form of its solid polymers such as paraformaldehyde. Another solid aldehyde which can conveniently be used is metaldehyde. The greater reactivity of paraformaldehyde, as compared with that of a dialkyl acetal, generally enables the reaction to proceed further to yield polymers of higher molecular weights.

To enable the forward reaction to run to completion the by-produced water is driven off. An effective method of doing this is by carrying out the reaction in a liquid medium in which the reaction mixture is wholly or partially soluble; for example, benzene, chlorobenzene, cyclohexane, ethylene dibromide, or toluene. This liquid medium should be compatible with the reactants and their products; that is, it should not enter into any chemical reaction therewith. Here the water is removed in large part by azeotropic distillation with the liquid medium. After the major portion of the water has been removed at atmospheric pressure, the solvent is removed by cooling the mixture and decantation thereof or by distillation first at atmospheric and finally at reduced pressure. The final traces of water are then eliminated by further heating under reduced pressure.

The reaction may be carried out in bulk; in which case the water can be removed continuously under reduced pressure.

Acetylenic polyacetals can be prepared from a mixture of two or more acetylenic glycols and an aldehyde; or from a single acetylenic glycol and a mixture of two or more aldehydes.

In addition to p-toluenesulfonic acid, catalysts which may be employed are sulfuric acid, hydrochloric acid, and ferric chloride.

The resulting polymers are generally solids, melting below 100° C. They burn quite vigorously, with little residue; and their observed heats of combustion agree with theoretical values. Other properties and characteristics of our polymers, which have been investigated systematically, are molecular weight (by cryoscopic methods), density, viscosity, hydroxyl content, infrared spectra, and results of wet chemical analyses.

Since the theoretical molar ratio of acetylenic glycol to aldehyde (both monomers being difunctional), needed to effect complete condensation polymerization, is 1:1, we may employ a molar excess of the aldehyde, upwards of a 1 percent, but not to exceed a 12 percent molar excess because even if such excess is used it does not enter into the polymer. This maximum of a 12 percent molar excess of aldehyde we consider to be critical, since larger amounts tend to vaporize and to condense on the upper walls of the reactor and other equipment. The resulting crude polymer retains a major part of the catalyst, and it is important that these impurities be held to a minimum, or be removed entirely, for the following reasons:

(1) These impurities are largely insoluble in the solvents that may be used for molecular weight determinations; and this can render accurate results in such determinations difficult or impossible to obtain.

(2) Accurate molecular weights of the polyacetals are important, since these compounds are intended to be reacted with other agents to produce rubber-like polymers; and the stoichiometry there involved must be met with precision.

(3) The presence in the crude polymer of catalyst and of more than an unsubstantial amount of unreacted aldehyde may cause further, uncontrolled polymerization during the later heating under vacuum, which is intended to remove last traces of water and of the liquid medium, where the latter is employed.

(4) Insufficient control of the amount of acid catalyst, and of unreacted aldehyde in the polymer, adversely affects the batch-to-batch reproducibility of a given polyacetal.

Certain halogen-containing liquids, such as ethylene dibromide, ethylene dichloride and methylene dichloride, are good solvents for polyacetals, but poor solvents for the aforementioned impurities in the crude polymers resulting from the practice of our invention. We have found that mixing the crude polymer with a suitable quantity of one of the solvents last named, and filtering the resulting solution of polyacetal from undissolved material, serves to remove any unreacted aldehyde and about one-half of the acid catalyst. The acid content then can be reduced virtually to zero by washing the solution with water, or by mixing with the solution a weakly basic ion exchange resin, for example, Amberlite IR–45. The latter consists essentially of polyamine in which the amino nitrogen atoms are attached to the benzene ring of a cross-linked polystyrene. The polystyrene is cross-linked with divinyl benzene or a similar difunctional monomer. The use of Amberlite IR–45 is illustrated in Example V below.

The need for economy in expenditure of time, effort and materials in removing any unreacted aldehyde from the crude polymer renders it highly important that the starting molar excess of aldehyde shall not exceed the maximum of 12 percent which we have found may need to be employed.

Statements herein, which relate to equivalent quantities, or to ratios or proportions of equivalents of named materials, are based upon the molar value of a reference material, usually a designated acetylenic glycol. Quantities stated in terms of "parts" mean parts by weight. All temperatures are stated in degrees centigrade.

The following examples are cited by way of illustration only, and are not intended to limit the description of our invention to any steps, quantities, operational conditions, or product characteristics recited therein.

*Example I*

A three-necked, 300 ml. flask was equipped with a thermometer, mechanical stirrer and Dean-Stark trap with a condenser attached. The flask was charged with 130 parts of toluene and 43 parts of 2-butyne-1,4-diol. Paraformaldehyde (15 parts) and 0.5 part of p-toluenesulfonic acid were added portionwise to the mixture, over a 3 to 3.5-hour period. After addition of the first portion of paraformaldehyde and catalyst the mixture was heated to reflux temperature (100°–110°). During the reaction nearly 9 ml. of water were collected in the Dean-Stark trap. The mixture was allowed to cool, and the toluene was decanted from a solid polymer. The polymer then was heated for 4 hours, under a pressure of 1 to 2 mm. at 80°–115°. A yield of 46 parts of a hard, waxy polymer, of molecular weight 2300, was obtained.

*Example II*

A three-necked flask, equipped as in Example I, was charged with 130 parts of benzene, 22 parts of 2,4-hexadiyne-1,6-diol, and 6.1 parts of paraformaldehyde. p-Toluenesulfonic acid (0.2 part) was added, and the mixture was heated at the boiling point for 3 hours. Approximately 3.0 ml. of water were distilled into the Dean-Stark trap during this time. The mixture was allowed to cool, and the benzene was decanted from a solid polymer. The polymer then was heated for 3 hours at 90°–100° under a pressure of 2 to 3 mm. The product was a dark colored, waxy solid, melting at 70°–75°, and having a molecular weight of 810.

*Example III*

In a 100 ml. flask, equipped with a nitrogen inlet tube and a mechanical stirrer, were mixed 16.2 parts of 2-butyne-1,4-diol, 6.3 parts of paraformaldehyde and 0.3 part of p-toluenesulfonic acid. The mixture was heated for 4 hours in an oil bath at 100°–125°, while a slow stream of nitrogen was bubbled through the system. It then was heated at 110° under vacuum (2 to 3 mm.) for 8 hours, during which time more than 3.0 ml. of water were distilled into a Dry Ice cold trap attached to the exit line. The product, consisting of 17 gm. of a solid polymer, had a melting point of 60°, and a molecular weight of 1250.

*Example IV*

A three-necked flask, equipped as in Example 1, was charged with 440 parts of ethylene dibromide. The liquid was heated to 110° in an oil bath, and 43 parts of 2-butyne-1,4-diol were added, followed by 16.5 parts of paraformaldehyde and 0.75 part of p-toluenesulfonic acid. The stirred mixture was heated to reflux temperature, and a mixture of water and ethylene dibromide was distilled into the Dean-Stark trap. The mixture boiled initially at 100°; but, as the water was gradually removed, the boiling point rose to that of pure ethylene dibromide (130°). A total of 9 ml. of water was collected in the trap. As the reaction proceeded, the originally insoluble starting materials were converted into a soluble polymer. The reaction mixture was heated for an hour after it has reached 130°. The solution was allowed to cool, and was filtered to remove traces of insoluble materials. The solvent then was removed from the filtrate under reduced pressure (water aspirator); and the residual polymer was heated for 8 hours at 100° under a pressure of 2 to 3 mm. A tan-colored product (44 parts) was obtained, with a molecular weight of 1300.

*Example V*

A 500 ml., three-necked, round bottom flask, equipped as in Example I, was charged with 43.04 gm. (0.5 mol) of crude 2-butyne-1,4-diol, 0.5 gm. of p-toluenesulfonic acid, and 250 ml. of benzene. The mixture was heated to 60°, and 50.08 gm. (0.5 mol) of 2-ethylbutyraldehyde were added. The theoretical amount of water was collected by azeotropic distillation during an 8-hour period of heating at 75°–82°. To remove the acid catalyst a mildly basic ion exchange resin, Amberlite IR–45 (10 gm.), was added, and the mixture was stirred at room temperature for 2 to 3 hours. The resin and impurities then were filtered off; and benzene and volatiles were distilled from the remaining product during a 5-hour heating period at 80°–90°/2–15 mm. A dark, viscous liquid was obtained. Its molecular weight, measured by the cryoscopic method, was 620.

*Example VI*

A three-necked flask, equipped as in Example I, was charged with 32.3 gm. (0.375 mol) of 2-butyne-1,4-diol, 13.8 gm. (0.125 mol) of 2,4-hexadiyne-1,6-diol, and 100 ml. of benzene. The mixture was heated, with stirring, to 60°–70°– and then 0.5 gm. of p-toluenesulfonic acid and 16.5 gm. (a 10 percent molar excess) of paraformaldehyde were added. Nearly the theoretical amount of water (9 ml.) was obtained by azeotropic distillation with benzene during an 8-hour period of heating at 75°–80°. Following heating for an additional 2 to 3 hours at 80°, to remove the last traces of by-produced water, the mixture was allowed to cool and to separate. The benzene was decanted from the layer of polymer. The latter was dissolved in 100 ml. of ethylene dibromide; and the solution was filtered through a sintered glass funnel. The solvent then was distilled off during an 8-hour period of heating at 90°–100°/2–3 mm. A brown, viscous, liquid product was obtained, which crystallized into a hard wax upon cooling. It molecular weight, obtained by the freezing-point depression of an ethylene dibromide solution, was 1440.

*Example VII*

A 500 ml. flask, equipped as in Example I, was charged with 250 ml. of benzene and 0.5 mol of 2-butyne-1,4-diol. The mixture was heated, with stirring, to 60°, and 0.5 gm. of anhydrous ferric chloride and a 1 percent molar excess of paraformaldehyde were added. The theoretical amount of water was collected during a 6-hour period of heating at 75°–80°. After dissolving the resulting polymer in ethyene dibromide and filtering, the solvent was removed by heating for 8 hours at 80°–90°/2–3 mm. A reddish, waxy solid was obtained.

*Example VIII*

Benzene and toluene were compared as reaction media in the practice of our invention.

(A) Four polymers were prepared in benzene as the reaction medium; the following steps, quantities, and other details being repeated in each trial:

A 500 ml. flask, equipped as in Example I, was charged with 200 ml. of benzene and 43.04 gm. (0.5 mol) of 2-butyne-1,4-diol. The mixture was heated, with stirring, to 50°–60°, and 0.5 gm. of p-toluenesulfonic acid and 16.5 gm. (0.55 mol) of paraformaldehyde were added; the latter in three equal portions at half-hour intervals. The reaction mixture was heated at 75°–80° for 5 hours, during which the theoretical amount of water (9 ml.), formed during the condensation, was removed by azeotropic distillation. The mixture was allowed to cool and to separate into a layer each of benzene and crude polymer. After decantation of the benzene the polymer was dissolved in 100 ml. of ethylene dibromide. The solution was suction-filtered through a sintered-glass funnel, and the filtrate was heated for 5 hours at 75°–80°/2–3 mm. to remove solvent and volatile materials.

The mean molecular weight of the product, as determined by the freezing-point depression of an ethylene dibromide solution, was 990.

(B) Four polymers were prepared in accordance with the details set forth in the second paragraph next above; except that (1) toluene was substituted for benzene as the reaction medium, and (2) the reaction temperature was higher (90°–110° C.).

The mean molecular weight of the four polymers prepared in toluene was 1750.

It is to be understood that modifications and changes in detail in the aforescribed means and method steps may be made without departing from the spirit of our invention; and that all exemplifications and variants of our novel methods and of the new products thereof, set forth hereinabove, are intended to be illustrative only, and in no sense limitative of the invention other than as the same is defined in the accompanying claims.

What is claimed is:

1. The method of preparing an acetylenic acetal polymer which comprises, mixing in a reaction vessel a quantity of 2-butyne-1,4-diol, from one to 1.12 molar equivalents, based upon the quantity of said diol, of paraformaldehyde, and a catalytic amount of p-toluenesulfonic acid; heating the mixture in an inert atmosphere, initially at atmospheric pressure and subsequently under a pressure of about 1 to 3 mm., at a temperature from about 100° C. to about 150° C., for a time sufficient to effect removal of by-produced water; separating the catalyst and any unreacted paraformaldehyde from the residue, and isolating a purified polymer.

2. The method of preparing an acetylenic acetal polymer which comprises, mixing in a reaction vessel a quantity of an acetylenic glycol having from 4 to 6 carbon atoms, from one to 1.12 molar equivalents, based upon the quantity of said glycol, of paraformaldehyde, and an effective amount of a catalyst of the class consisting of ferric chloride, hydrochloric acid, sulfuric acid, and p-toluenesulfonic acid; heating the mixture in an inert atmosphere, initially at atmospheric pressure and subsequently under a pressure of about 1 to 3 mm., at a temperature from about 100° C. to about 150° C., for a time sufficient to effect removal of by-produced water; and isolating the residual polymer.

3. The method as defined in claim 2 plus the steps of separating the catalyst and any unreacted paraformaldehyde from the residual polymer, and isolating a purified polymer.

4. The method of preparing an acetylenic acetal polymer which comprises, mixing in a reaction vessel equimolar quantities of 2-butyne-1,4-diol and of paraformaldehyde, a catalytic amount of p-toluenesulfonic acid, and about 3 parts by weight of toluene per part by weight of the diol; heating the mixture of a refluxing temperature of about 100° C. to 110° C. for a time sufficient to effect removal of substantially all of the by-produced water; cooling the residual mixture and separating the crude polymer by settling it out of the toluene; removing the supernatant toluene; heating the polymer at about 80° C. to 115° C., under a pressure of about 1 to 2 mm., for a time sufficient to eliminate any remaining toluene from the polymer; and isolating a purified polymer.

5. The method of preparing an acetylenic acetal polymer which comprises, mixing in a reaction vessel a quantity of an acetylenic glycol of the class consisting of 2-butyne-1,4-diol and 2,4-hexadiyne-1,6-diol, from one to 1.12 molar equivalents, based upon the quantity of glycol, of an aldehyde of the class consisting of 2-ethylbutyraldehyde, metaldehyde, and paraformaldehyde, an effective amount of a catalyst of the class consisting of ferric chloride, hydrochloric acid, sulfuric acid, and p-toluenesulfonic acid, and from about 2 parts to about 10 parts by weight, per part by weight of the glycol, of a compatible liquid medium of the class consisting of benzene, chlorobenzene, cyclohexane, ethylene dibromide, and toluene; heating the mixture to a refluxing temperature for a time sufficient to effect removal of substantially all of the by-produced water; permitting the residual mixture to cool, and the liquid medium to separate from a crude polymer; removing the separated liquid medium; heating the polymer at about 80° C. to 150° C., under a pressure of about 1 to 15 mm., for a time sufficient to eliminate any remaining liquid medium from the polymer; and isolating a residual polymer.

6. The method as defined in claim 5 plus the steps of separating the catalyst and any unreacted aldehyde from the residual polymer, and isolating a purified polymer.

7. The method of preparing an acetylenic acetal polymer which comprises refluxing, with removal of formed water, a mixture of an acetylenic glycol having 4 to 6 carbon atoms and an aldehyde having up to 8 carbon atoms, said aldehyde being in up to 12 percent molar excess.

8. The method of preparing an acetylenic acetal polymer which comprises heating a mixture of an acetylenic glycol having 4 to 6 carbon atoms, an aldehyde having up to 8 carbon atoms, and a solvent for said reactants which is non-reactive therewith, and removing formed water by distillation, said aldehyde being in up to 12 percent molar excess.

9. The method as in claim 7 in which a strong acid catalyst of the group consisting of p-toluenesulfonic acid, sulfuric acid, hydrochloric acid and ferric chloride is additionally present.

10. The method as in claim 8 in which a strong acid catalyst of the group consisting of p-toluenesulfonic acid, sulfuric acid, hydrochloric acid, and ferric chloride is additionally present.

11. An acetylenic acetal polymer of an acetylenic glycol having 4 to 6 carbon atoms and an aldehyde having up to 8 carbon atoms.

12. A polymer as in claim 11 in which said aldehyde is formaldehyde.

13. An acetylenic acetal polymer of an acetylenic glycol of the group consisting of 2-butyne-1,4-diol and 2,4-hexadiyne-1,6-diol and an aldehyde of the group consisting of 2-ethylbutyraldehyde, metaldehyde and formaldehyde.

No references cited.